US012791367B2

(12) United States Patent
Curinier

(10) Patent No.: US 12,791,367 B2
(45) Date of Patent: Nov. 10, 2026

(54) FLOW RATE MEASUREMENT DEVICE

(71) Applicant: F-REG, Nice (FR)

(72) Inventor: Emmanuel Curinier, Nice (FR)

(*) Notice: Subject to any disclaimer, the term of this patent is extended or adjusted under 35 U.S.C. 154(b) by 344 days.

(21) Appl. No.: 18/263,534

(22) PCT Filed: Jan. 28, 2022

(86) PCT No.: PCT/EP2022/052036
§ 371 (c)(1),
(2) Date: Jul. 30, 2023

(87) PCT Pub. No.: WO2022/162138
PCT Pub. Date: Aug. 4, 2022

(65) Prior Publication Data

US 2024/0085224 A1 Mar. 14, 2024

(30) Foreign Application Priority Data

Jan. 29, 2021 (FR) .................................. FR2100847

(51) Int. Cl.
*G01F 1/28* (2006.01)
*G01P 5/04* (2006.01)
*G01F 1/002* (2022.01)

(52) U.S. Cl.
CPC .................. *G01F 1/28* (2013.01); *G01P 5/04* (2013.01); *G01F 1/002* (2013.01)

(58) Field of Classification Search
CPC ... G01F 1/002; G01F 1/28; G01F 1/30; G01P 5/04
See application file for complete search history.

(56) References Cited

U.S. PATENT DOCUMENTS

| | | | | |
|---|---|---|---|---|
| 1,626,216 A * | 4/1927 | Stratton | G01F 1/28 | 73/861.76 |
| 2,359,592 A * | 10/1944 | Stokoe | G01F 1/28 | 73/861.75 |
| 2,461,351 A | 2/1949 | Silverman | | |
| 2,765,656 A * | 10/1956 | Parshall | G01F 1/002 | 73/861.75 |

(Continued)

FOREIGN PATENT DOCUMENTS

| | | |
|---|---|---|
| ES | 1077812 U | 10/2012 |
| GB | 191008320 A | 4/1911 |
| JP | 2021009090 A | 1/2021 |

OTHER PUBLICATIONS

ISR; European Patent Office; NL; Apr. 11, 2022.

*Primary Examiner* — Justin N Olamit
(74) *Attorney, Agent, or Firm* — PatShegen IP; Moshe Pinchas

(57) ABSTRACT

The device (20) for measuring the flowrate of a liquid in a pipeline, comprises, on a mount (21) fixed to a perimeter of the pipeline, a part (24) rotatably moveable around a first shaft (25) through the action of the flow of liquid.
The device also comprises:
- a mass (33) supported by an arm (29) in rotation around a second shaft (32);
- an angle multiplier (26, 27) configured to transform the angular movement of the moveable part into an angular movement of the arm supporting the mass, this arm travelling through an angle greater than the angle travelled by the moveable part; and
- a sensor (37) of the position of the arm supporting the mass.

9 Claims, 6 Drawing Sheets

(56) References Cited

U.S. PATENT DOCUMENTS

| | | | | | |
|---|---|---|---|---|---|
| 3,717,935 | A | | 2/1973 | Meier | |
| 3,766,544 | A | * | 10/1973 | Batz | G01D 5/2412<br>340/870.37 |
| 5,275,042 | A | | 1/1994 | Carson | |
| 6,009,762 | A | * | 1/2000 | Ockleston | G01F 1/002<br>73/861.74 |
| 6,032,540 | A | * | 3/2000 | Hawkins | G01F 15/001<br>73/861.74 |

* cited by examiner

FLOW RATE MEASUREMENT DEVICE

TECHNICAL FIELD OF THE INVENTION

The present invention relates to a flowrate measurement device. It applies, in particular, to the measurement of the flowrate in wastewater or rainwater pipelines.

STATE OF THE ART

Flowrate measurement devices are effective in the following cases: for low liquid flowrates, weakly-variable flowrates, uniform liquids, sealed pipelines, and laminar flows. This is because they can comprise parts, such as propellers, positioned in the liquid flow. For example, fuel pump flow meters are very accurate. However, in cases of liquid flowrates in tens, even hundreds, of litres per second, rapidly-varying flowrates, liquids that can carry solids or waste, open pipelines where the liquid is under an air atmosphere, and turbulent flows, flowrate measurement devices are very inaccurate.

PRESENTATION OF THE INVENTION

The present invention aims to remedy all or part of these drawbacks.

To this end, the present invention envisions a device for measuring the flowrate of a liquid in a pipeline, which comprises, on a mount fixed to a perimeter of the pipeline:

- a part rotatably moveable around a first shaft through the action of the flow of liquid;
- a mass supported by an arm in rotation around a second shaft;
- an angle multiplier configured to transform the angular movement of the moveable part into an angular movement of the arm supporting the mass, this arm travelling through an angle greater than the angle travelled by the moveable part; and
- a sensor of the position of the arm supporting the mass.

Thanks to these provisions, the high, rapidly-varying liquid flowrates, that can carry solids or waste at the inlet of the pipeline where the liquid is under an air atmosphere, in turbulent flows, can be measured in a stable and accurate way. The mass, its mount and the angle multiplier perform a role of damping the turbulences and variations in the flowrate. The sensor can therefore make reliable measurements.

In addition, the mass, its mount and the angle multiplier reduce the angle of inclination of the moveable part, in the case where the inlet is in the open air, forcing the liquid to follow a steeper slope and be carried away by a straighter inlet than in the absence of these elements. The amplitude of the flowrates measured is therefore increased.

In some embodiments, the moment of inertia of the mass is higher than the moment of inertia of the moveable part.

The damping and angle reduction effects described above are thus increased.

In some embodiments, the moveable part is rectangular and the device comprises flat side flanks perpendicular to the plane of the moveable part and at a constant distance from the moveable part.

In some embodiments, the distance between the side flanks and the moveable part is less than one tenth of the distance between the side flanks.

Thanks to each of these provisions, the angle travelled by the arm that supports the mass is increased for the same liquid flowrate.

In some embodiments, the angle multiplier comprises a multiplier arm connected to a third rotating shaft secured to the moveable part, and to a fourth rotating shaft secured to the arm supporting the mass, the distance between the first and third shafts being greater than the distance between the second and fourth shafts.

In some embodiments, the angle multiplier is configured such that the ratio of the angle travelled by the arm supporting the mass to the angle travelled by the moveable part is at least equal to two.

In some embodiments, the position sensor comprises an inclinometer.

In some embodiments, the position sensor comprises an accelerometer.

Thanks to each of these provisions, the position sensor comprises no mechanical part exposed to the flow of liquid. Thus, there is no risk of this sensor being clogged.

In some embodiments, the moveable part has a surface at least equal to one tenth of a square metre.

In some embodiments, the mass is greater than one kilogramme.

Thanks to these provisions, the device is suitable for measuring flowrates greater than one hundred litres per second.

BRIEF DESCRIPTION OF THE FIGURES

Other advantages, aims and particular features of the invention will become apparent from the non-limiting description that follows of at least one particular embodiment of the device that is the subject of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that FIGS. 1 to 8 are each to scale, and the various figures may be to different scales.

Throughout the description, the term “inner” or “central” refers to being located close to or oriented towards an axis of the pipeline, and “outer” refers to being located farther away from or oriented to the opposite of this axis. The term “top” or “upper” refers to being located at the top in FIGS. 1, 3, 4, 5, 7, 8, figures which correspond to the configuration of use for the device, gravity being exerted downwards in these figures. The term "bottom" or "lower" refers to being located at the bottom in these figures. The height of the device is defined from the bottom to the top in these figures, and the width is defined from left to right in them. The depth is measured along the axis of the pipeline. The term "front" refers to being oriented in the direction of the liquid outlet from the pipeline, and "rear" to the opposite direction. The term "face" refers to the portion of the device visible from the front of the device.

FIGS. 1 to 4 show a device 20 mounted at the inlet of a pipeline 40. In other embodiments, a device that is the subject of the invention is mounted inside a pipeline or between two pipelines.

Figure 1:
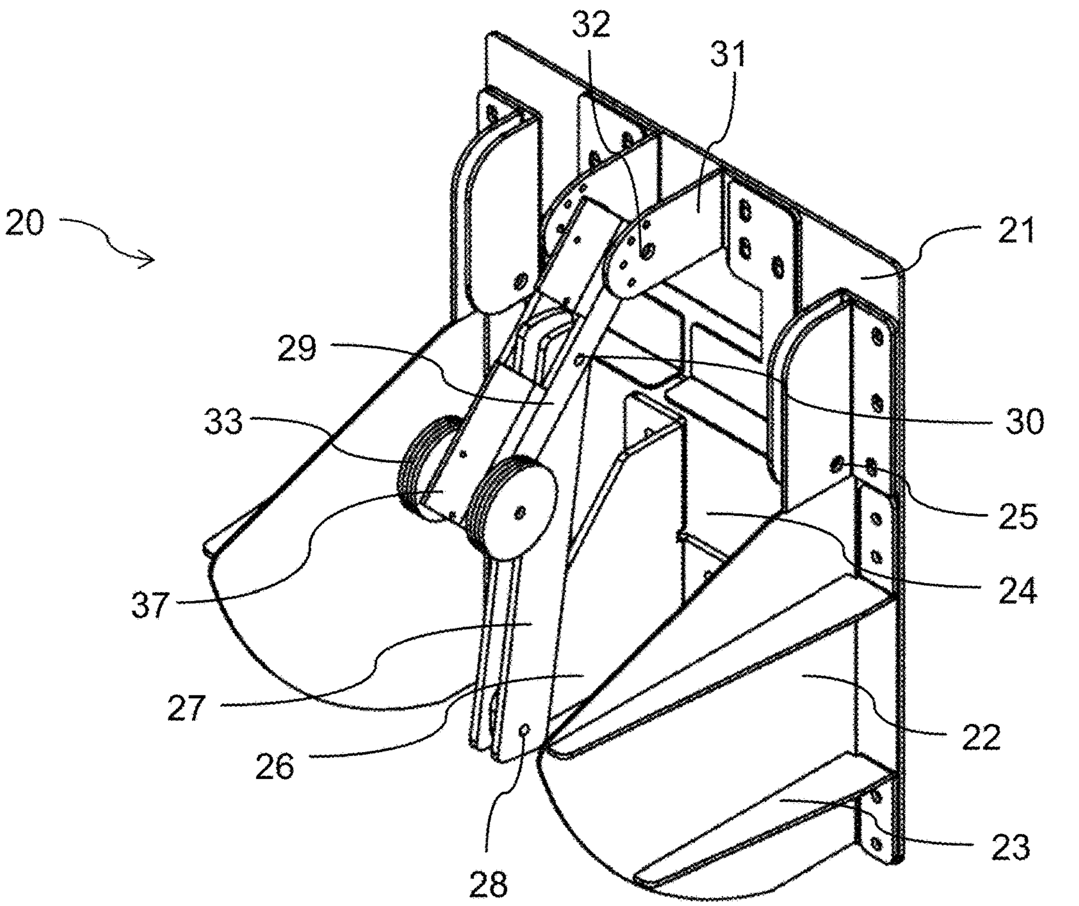
FIG. 1 represents, schematically in a perspective view, a particular embodiment of the device that is the subject of the invention, when the flowrate of water is zero.
Figure 2:
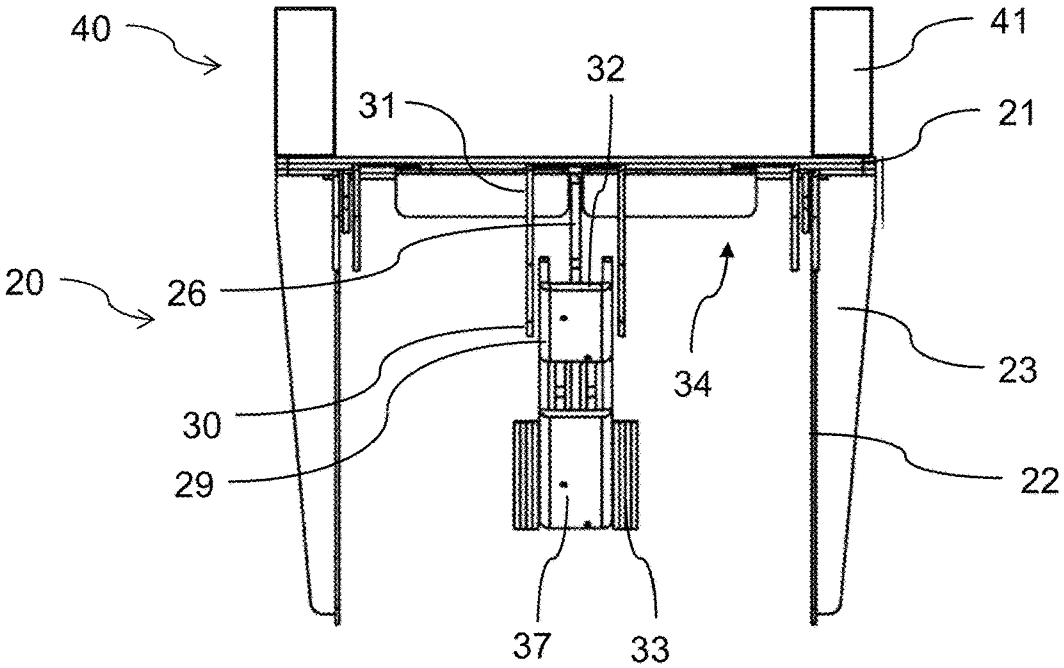
FIG. 2, represents, schematically in a top view, the device illustrated in FIG. 1.
Figure 3:
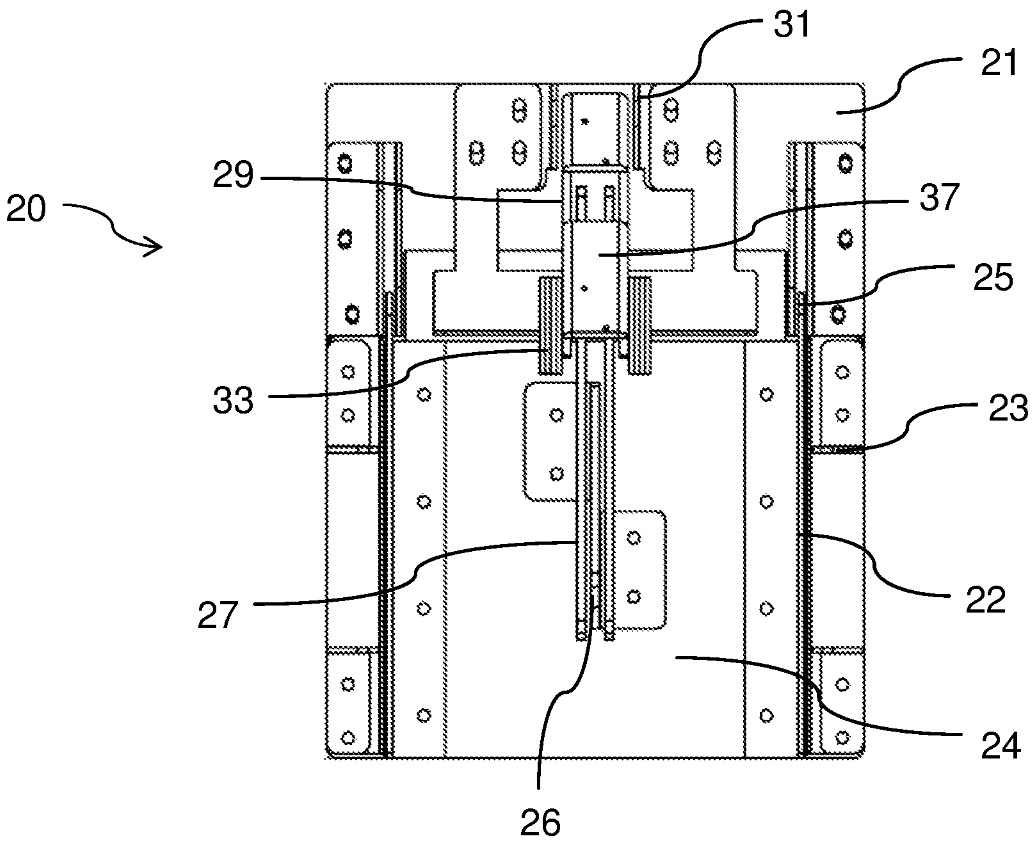
FIG. 3, represents, schematically in a front view, the device illustrated in FIGS. 1 and 2.
Figure 6:
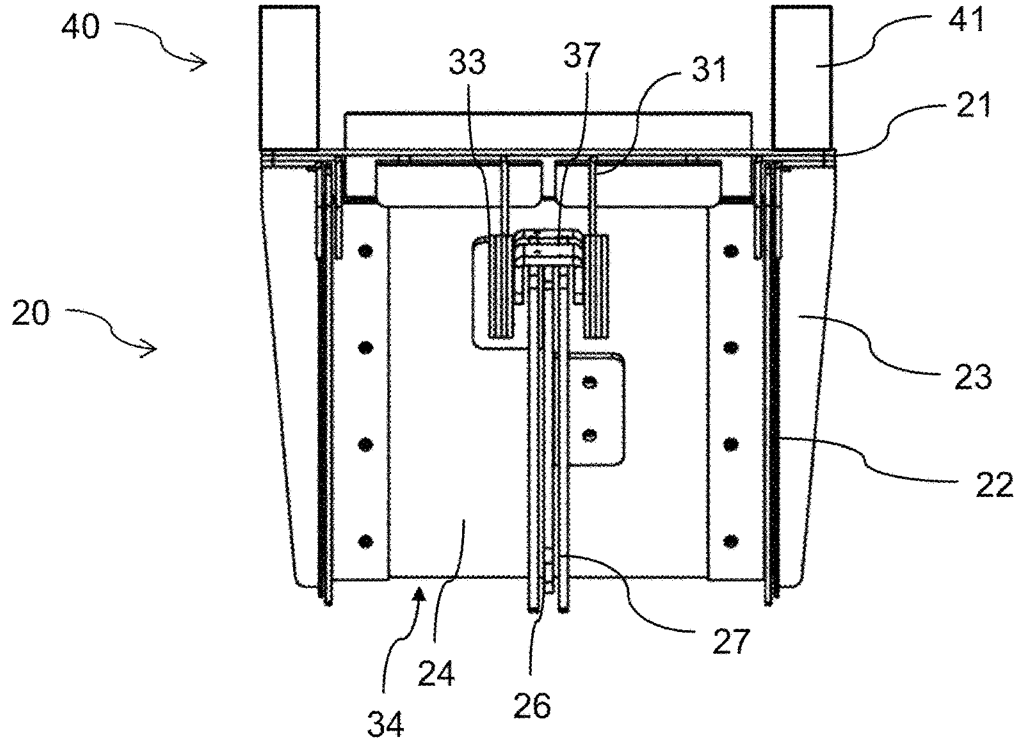
FIG. 6, represents, schematically in a top view, the device illustrated in FIG. 5.
Figure 7:
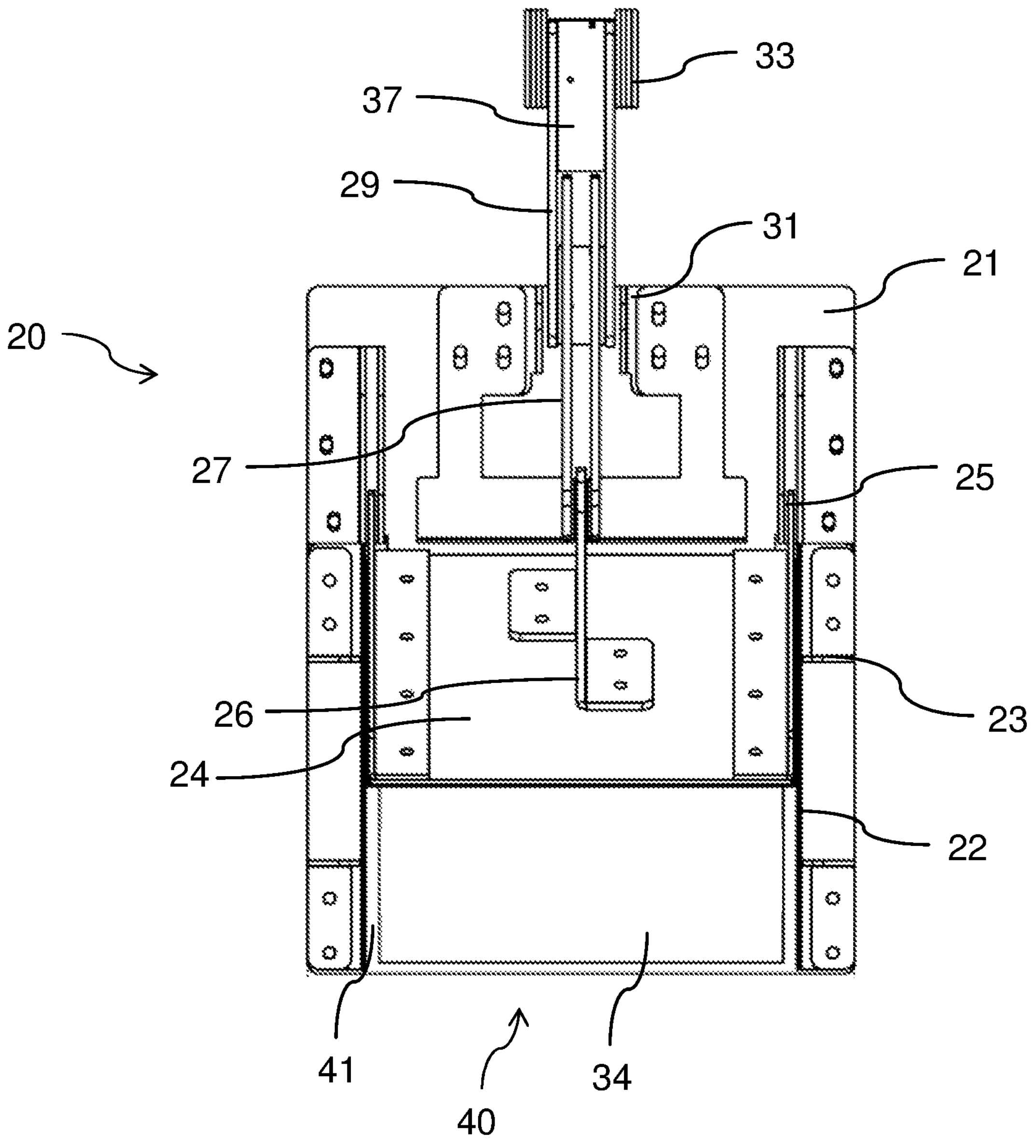
FIG. 7 represents, schematically in a front view, the device illustrated in FIGS. 5 and 6.

The pipeline 40 has a section 34 and walls 41 only and partially shown in FIGS. 2, 6 and 7.

The device 20 constitutes, in the figures, an "ND400 equivalent" (acronym for "nominal diameter 400 mm") valve.

The device 20 comprises a fixed flat frame 21 supporting two vertical side flanks 22, each equipped with two strengthening brackets 23. A moveable part 24 is put into motion around a first rotating shaft 25 by the flow of liquid. An arm 29 is rotatably mobile around a second rotating shaft 32 borne by two flat parts 31 perpendicular to the fixed frame 21. The arm 29 bears, at its extremity opposite the fourth rotating shaft 30, a mass 33 with a moment of inertia preferably higher than the moment of inertia of the moveable part 24. A flat part 26, perpendicular to the moveable part 24, is fixed on this moveable part 24. The flat part 26 bears a third rotating shaft 28 rotatably supporting an extremity of an arm 27. At its other extremity, the arm 27 bears a fourth rotating shaft 30 which supports the arm 29.

Preferably, the distance between the first shaft 25 and third shaft 28 is greater than the distance between the second shaft 32 and fourth shaft 30.

Figure 4:
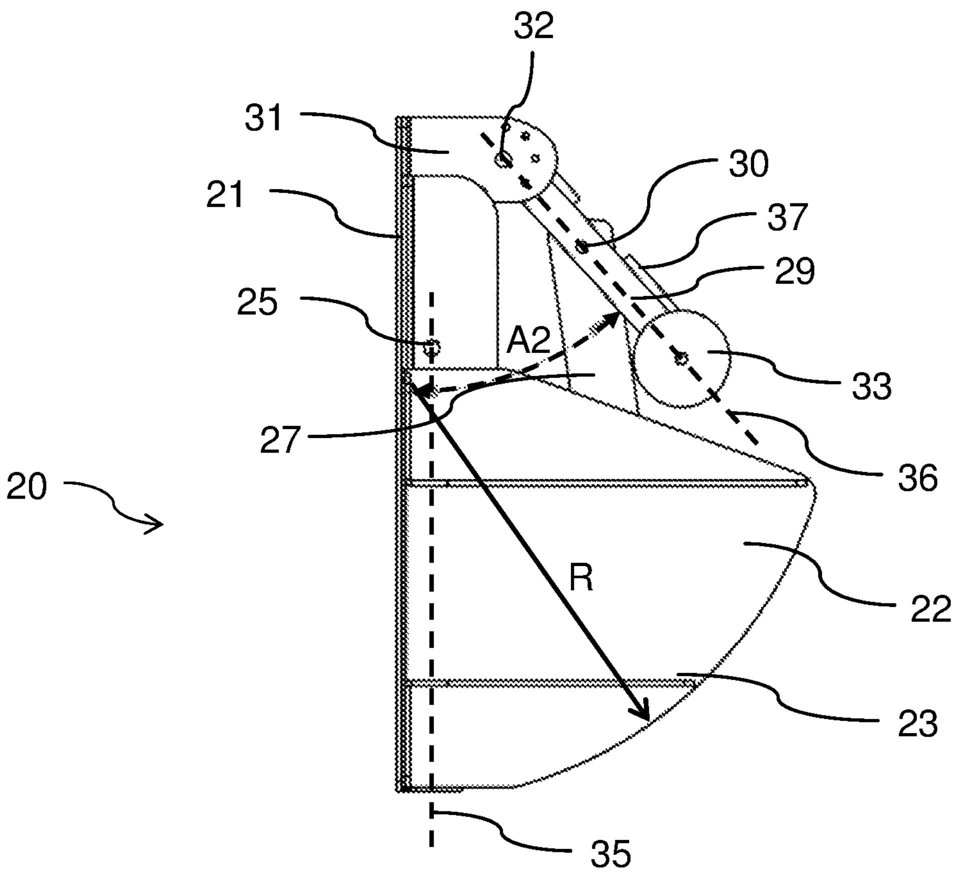
FIG. 4 represents, schematically in a side view, the device illustrated in FIGS. 1 to 3.
Figure 5:
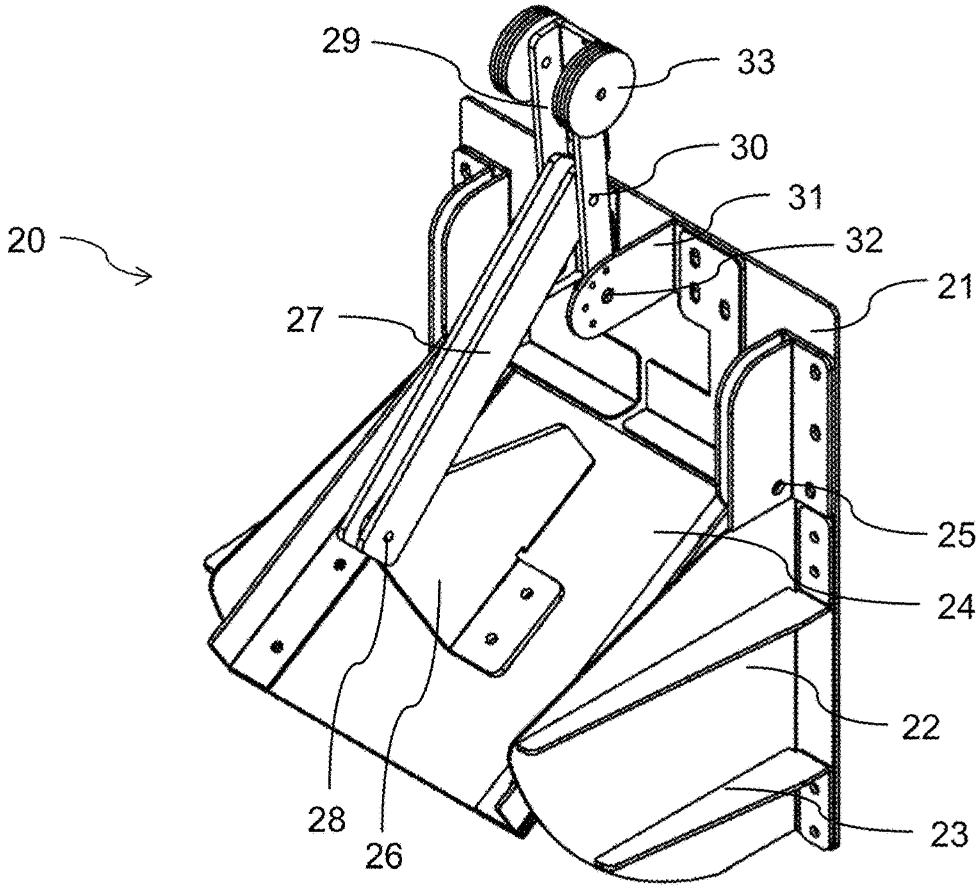
FIG. 5 represents, schematically in a perspective view, a particular embodiment of the device that is the subject of the present invention, when the flowrate of water is high.

When there is no flow of liquid, the moveable part 24 is vertical, and an axis 35 of the line joining the moveable part and the mounted part 26 is vertical, as shown in FIG. 4.

The vertical side flanks 22 have a partially circular shape covering the surface travelled by the vertical sides of the moveable part 24. The radius R (see FIG. 4) of the circular portion of the side flanks 22 is therefore preferably greater than or equal to the height of the moveable part 24.

The distance between the side flanks 22 and the moveable part 24 is preferably less than one tenth of the distance between the side flanks 22.

When there is no flow of liquid, i.e. a zero flowrate, the axis 36 from the second shaft 32 to the centre of gravity of the assembly formed by the arm 29 and the mass 33 has an angle A2 to the vertical, as shown in FIG. 4.

FIGS. 5 to 8 show that, in the presence of a flow of liquid, i.e. a non-zero flowrate, the moveable part 24 is tilted upwards as a result of the thrust exerted by the flow of liquid.

Figure 8:
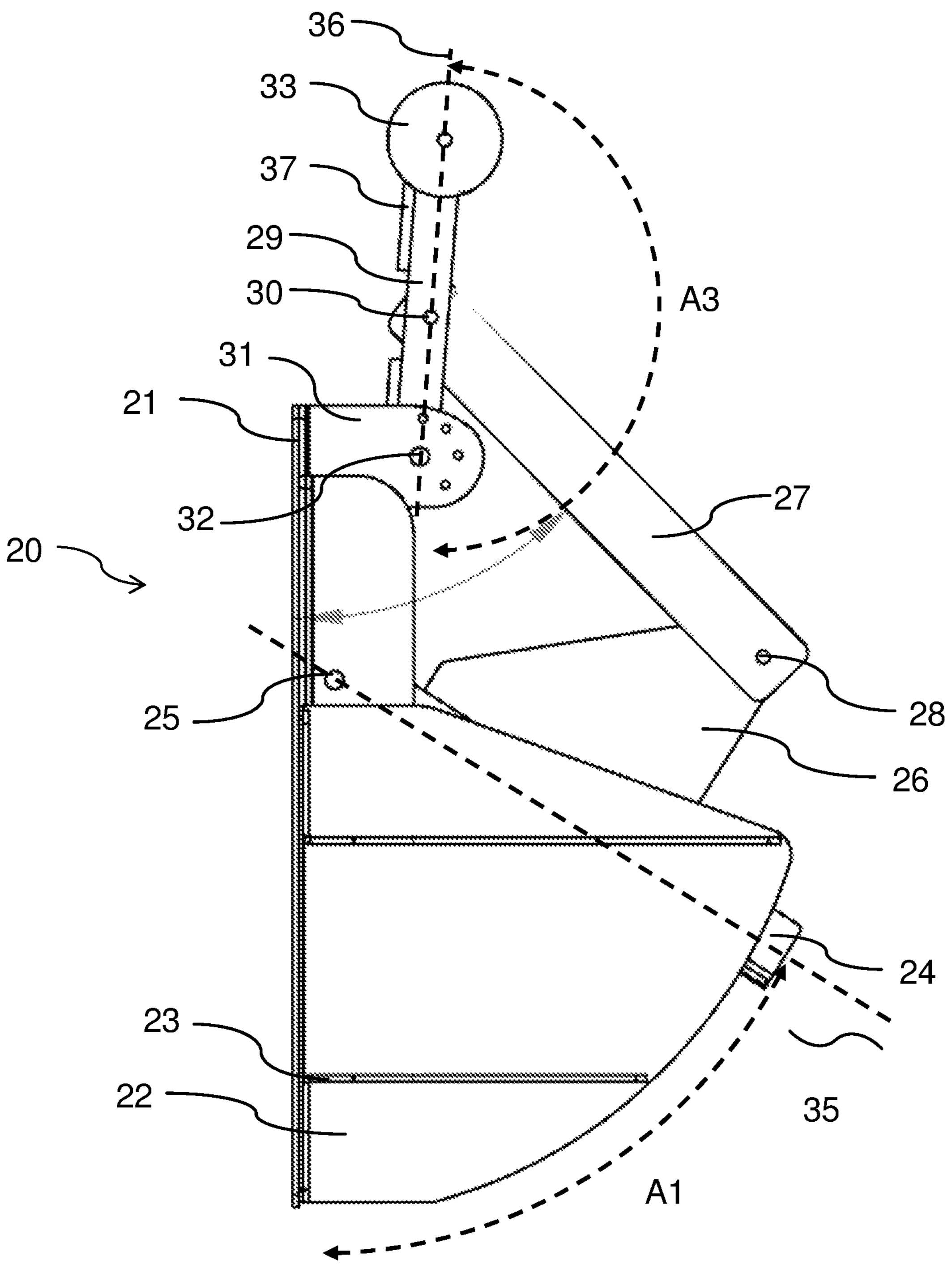
FIG. 8 represents, schematically in a side view, the device illustrated in FIGS. 5 to 7.

In the presence of a flow of liquid, the axis 35 of the line joining the moveable part and the mounted part 26 has an angle A1 to the vertical, as shown in FIG. 8. The axis 36 from the second shaft 32 to the centre of gravity of the assembly formed by the arm 29 and the mass 33 has an angle A3 to the vertical, as shown in FIG. 8.

In the embodiment shown, for the highest flowrates, when the moveable part is fully raised and the angle A1 is the greatest, the mass 33 is almost vertical to its axis 32, such that it no longer exerts a closing force that would reduce the flowrate passing through the device.

As is understood by reading the description above, the mounted part 26, the arm 27 and the arm 29 form an angle multiplier that transforms the angular movement of the moveable part 26 into an angular movement of the arm 29 supporting the mass 33, this arm 29 travelling through an angle A3-A2 greater than the angle A1 travelled by the moveable part 24.

In some embodiments, the angle multiplier is configured such that the ratio of the angle A3-A2 travelled by the arm 29 supporting the mass 33 to the angle A1 travelled by the moveable part 24 is at least equal to two.

Of course, other combinations of arms in movement make it possible to obtain the same angle multiplier effect and the present invention is therefore not limited to the example of angle multiplier shown in FIGS. 1 to 8.

A sensor 37 of the position of the arm 29 supporting the mass 33 measures the angle A3 and deduces the liquid flowrate, based on a function or a correspondence table stored in memory. For example, the correspondence function for the correspondence between the flowrate measured and the difference between the angle A3 and the angle A2, is a polynomial or exponential function. For example, for the values of A3-A2 angle difference greater than or equal to 10°:

an A3-A2 angle difference equal to 10° corresponds to a flowrate of 10 litres per second;

an A3-A2 angle difference equal to 20° corresponds to a flowrate of 25 litres per second;

an A3-A2 angle difference equal to 30° corresponds to a flowrate of 50 litres per second;

an A3-A2 angle difference equal to 40° corresponds to a flowrate of 94 litres per second; and an A3-A2 angle difference equal to 50° corresponds to a flowrate of 170 litres per second.

This corresponds to the function $$\text{flowrate (l/s)}=\exp[((A3-A2)/100)*5.5]*11.5-10,$$

where A3-A2 is expressed in angle degrees.

In other embodiments, a table of the correspondence between the angles to the vertical of the moveable part 24 and of the arm 29 is utilised. In the example described in the figures, this correspondence table is:

| Angle of arm 29 (degrees) | Angle of moveable part 24 (degrees) |
|---|---|
| 41.8 | 0 |
| 46.8 | 2.05 |
| 51.8 | 4.21 |
| 56.8 | 6.45 |
| 61.8 | 8.75 |
| 66.8 | 11.09 |
| 71.8 | 13.46 |
| 76.8 | 15.85 |
| 81.8 | 18.25 |
| 86.8 | 20.65 |
| 91.8 | 23.05 |
| 96.8 | 25.44 |
| 101.8 | 27.8 |
| 106.8 | 30.15 |
| 111.8 | 32.46 |
| 116.8 | 34.75 |
| 121.8 | 36.99 |
| 126.8 | 39.2 |
| 131.8 | 41.36 |
| 136.8 | 43.48 |
| 141.8 | 45.55 |
| 146.8 | 47.56 |
| 151.8 | 49.52 |
| 156.8 | 51.42 |
| 161.8 | 53.27 |
| 166.8 | 55.05 |

-continued

| Angle of arm 29 (degrees) | Angle of moveable part 24 (degrees) |
|---|---|
| 171.8 | 56.76 |
| 176.8 | 58.41 |

Examples of dimensions and masses utilised are given below:

width of the device 20 between 30 cm and 70 cm;
height of the device 20 between 40 cm and 85 cm;
depth of the device 20 between 25 cm and 55 cm;
height of the moveable part 24 between 15 cm and 55 cm;
width of the moveable part 24 between 20 cm and 60 cm;
surface of the moveable part 24 preferably at least equal to one tenth of a square metre for an ND400 pipeline;
angle A2 between 30° and 55°;
mass 33 greater than 1 kg, preferably greater than or equal to 2 kg;
distance between the third and fourth shafts between 22 cm and 55 cm.

With these dimensions, the high, rapidly-varying liquid flowrates, that can carry solids or waste at the inlet of the pipeline where the liquid is under an air atmosphere, in turbulent flows, can be measured in a stable and accurate way.

As shown in the figures, in some embodiments, the mount 21 fixed to a perimeter of the pipeline, and the moveable part 24 form a check valve.

In the figures, the moveable part 24 is rectangular. In other embodiments, the moveable part is not flat and/or is not rectangular. For example, the moveable part 24 is circular or spherical, the flanks 22 therefore having a toroidal internal surface.

In some embodiments, the position sensor 37 comprises an inclinometer. In some embodiments, the position sensor 37 comprises an accelerometer. Thus, the position sensor 37 comprises no mechanical part exposed to the flow of liquid. Thus, there is no risk of this sensor being clogged.

In some embodiments, the moveable part has a surface at least equal to one tenth of a square metre.

The invention claimed is:

1. A device for measuring the flowrate of a liquid in a pipeline, which device comprises, on a mount fixed to a perimeter of the pipeline, a part rotatably moveable around a first shaft through an action of a flow of liquid, the device also comprising:

a mass supported by an arm in rotation around a second shaft, said mass is configured for damping turbulences and variations in the flowrate of the liquid;

an angle multiplier configured to transform an angular movement of the part rotatably moveable around the first shaft into an angular movement of the arm supporting the mass, this arm travelling through an angle greater than an angle travelled by the part rotatably moveable around the first shaft; and a sensor of a position of the arm supporting the mass;

wherein the moment of inertia of the mass is higher than the moment of inertia of the part rotatably moveable around the first shaft.

2. The device according to claim 1, wherein the part rotatably moveable is rectangular and the device comprises flat side flanks perpendicular to a plane of the moveable part and at a constant distance from the part rotatably moveable around the first shaft.

3. The device according to claim 2, wherein a distance between the side flanks and the part rotatably moveable around the first shaft is less than one tenth of a distance between the side flanks.

4. The device according to claim 1, wherein the angle multiplier comprises a multiplier arm connected to a third rotating shaft secured to the part rotatably moveable around the first shaft, and to a fourth rotating shaft secured to the arm supporting the mass, a distance between the first and third shafts being greater than a distance between the second and fourth shafts.

5. The device according to claim 1, wherein the angle multiplier is configured such that a ratio of the angle travelled by the arm supporting the mass to the angle travelled by the part rotatably moveable around the first shaft is at least equal to two.

6. The device according to claim 1, wherein the sensor of a position comprises an inclinometer.

7. The device according to claim 1, wherein the sensor of a position comprises an accelerometer.

8. The device according to claim 1, wherein the part rotatably moveable around the first shaft has a surface at least equal to one tenth of a square meter.

9. The device according to claim 1, wherein the mass is greater than one kilogram.

* * * * *